United States Patent [19]
Steinbach et al.

[11] Patent Number: 5,128,302
[45] Date of Patent: Jul. 7, 1992

[54] PROCESS FOR THE MANUFACTURE OF A CATALYST FOR TREATMENT OF EXHAUST GAS TO REDUCE VOLATILE COMPOUNDS CONTAINING NITROGEN AND OXYGEN, THE CATALYST AND METHOD OF REDUCING THE COMPOUNDS CONTAINING NITROGEN AND OXYGEN IN THE EXHAUST GAS

[75] Inventors: Friedrich Steinbach, Trenknerweg 133, D-200 Hamburg 52; Reinhild Ellmers-Kutzinski, Hamburg; Andreas Brunner, Hamburg; Holger Müller, Hamburg, all of Fed. Rep. of Germany

[73] Assignee: Friedrich Steinbach, Hamburg, Fed. Rep. of Germany

[21] Appl. No.: 527,104

[22] Filed: May 22, 1990

[30] Foreign Application Priority Data
Jun. 1, 1989 [DE] Fed. Rep. of Germany ....... 3917900

[51] Int. Cl.$^5$ ............... B01J 23/24; B01J 23/34; B01J 37/00
[52] U.S. Cl. ............... 502/241; 502/60; 502/247; 502/254
[58] Field of Search ............... 502/60, 241, 247, 254; 423/212 C, 213.2

[56] References Cited
U.S. PATENT DOCUMENTS

| | | | |
|---|---|---|---|
| 3,513,109 | 5/1970 | Stiles | 423/213.2 |
| 3,565,574 | 2/1971 | Kearby et al. | 423/213.2 |
| 3,974,040 | 8/1976 | Siebke et al. | 204/1 T |
| 4,070,307 | 1/1978 | Carlson | 252/428 |
| 4,107,078 | 8/1978 | Carlson | 252/428 |
| 4,124,531 | 11/1978 | Frame | 252/428 |
| 4,159,964 | 7/1979 | Frame | 252/428 |
| 4,168,245 | 9/1979 | Carlson et al. | 252/431 |
| 4,234,455 | 11/1980 | Homeier et al. | 252/430 |
| 4,293,442 | 10/1981 | Frame | 252/428 |
| 4,381,922 | 5/1983 | Frey et al. | 422/98 |
| 4,396,899 | 8/1983 | Ohno | 338/34 |
| 4,668,349 | 5/1987 | Cuellar et al. | 204/59 R |
| 4,970,188 | 11/1990 | Steinbach et al. | 502/163 |

FOREIGN PATENT DOCUMENTS 0228398 7/1987 European Pat. Off. .

OTHER PUBLICATIONS

Ullmann's Encyklopadie der technischen Chemie (English version), 1986, vol. A5, pp. 347–353.
Steinbach, F. and Schmidt, H., Journal of Catalysis, vol. 39, pp. 190–197 (1975).

*Primary Examiner*—Carl F. Dees
*Attorney, Agent, or Firm*—Thomas N. Ljugman

[57] ABSTRACT

Process of manufacture, and method of use of a carrier-supported catalyst with transition metal phthalocyanines for the oxidizing treatment of exhaust gases which gases contain volatile compounds containing oxygen and/or nitrogen, which catalyst can be obtained by charging a carrier with at least one transition metal phthalocyanine and activation of the charged carrier with (i) a gas mixture which contains nitrogen oxide and/or oxygen, at temperatures between room temperature and 500° C., or with (ii) a solution which contains nitric acid and/or an oxidation agent.

20 Claims, No Drawings

PROCESS FOR THE MANUFACTURE OF A CATALYST FOR TREATMENT OF EXHAUST GAS TO REDUCE VOLATILE COMPOUNDS CONTAINING NITROGEN AND OXYGEN, THE CATALYST AND METHOD OF REDUCING THE COMPOUNDS CONTAINING NITROGEN AND OXYGEN IN THE EXHAUST GAS

BACKGROUND OF THE INVENTION

1. Field of the Invention

Use of a carrier-supported transition metal phthalocyanine catalyst for the removal of organic compounds containing oxygen and/or nitrogen from exhaust gases.

The invention relates to the use of a carrier-supported catalyst on the basis of transition metal phthalocyanines for the oxidation treatment of exhaust gases which contain volatile organic compounds containing oxygen and/or nitrogen.

2. Background Information

It is known that a catalyst can be formed from industrial metal phthalocyanines and a carrier to remove nitrogen oxides, carbon monoxide and/or residual hydrocarbons from exhaust gases (German Laid Open Patent Application No. 35 22 637 and European Laid Open Patent Application No. 0 228 398). For this purpose, the metal phthalocyanines are treated with oxidizing gas mixtures, so that in a controlled partial decomposition of the stable complexes, assisted by the wide separation of the metal ions from one another, as a result of the structure of the complex, a highly irregular, stable and highly-active catalyst preparation is formed which differs greatly from the stoichiometric oxide and from the stoichiometric metal complex.

Several processes are disclosed for the prior fixing of the metal phthalocyanine on carriers for transformation into the active components. These include the saturation of the carrier with solutions and suspensions, the precipitation of carrier materials from metal phthalocyanine suspensions, with subsequent shaping and drying, the conversion of metal phthalocyanines into soluble derivates, to facilitate saturation, and the direct synthesis of the metal phthalocyanine from soluble preliminary stages on the carriers. If the metal phthalocyanines are to be deposited on an intermediate layer and not applied directly on the carrier, this intermediate layer can be applied before the application of the metal phthalocyanines, but also simultaneously with the application of the metal phthalocyanines in a single step.

German Laid Open Patent Application No. 35 22 637 discloses the use of metal phthalocyanines only for the catalytic conversion of NO, CO and residual hydrocarbons.

The purification of exhaust gases or waste gases is expensive, and the manufacture of the catalysts represents a significant proportion of the cost. The criteria for the beneficial, undesirable and acceptable residual levels are constantly becoming stricter, and are being extended to cover new substances. In many cases, these stricter requirements are being written into laws. For these reasons, a broadening of the scope of application of economical and effective catalysts of the prior art is desirable. One notable use of these catalysts includes the removal of all types of organic compounds containing oxygen and/or nitrogen in exhaust gases. Such a removal is already legally required to a great extent, and will doubtless become even so in the future. Even after the already widespread practice of recovering these substances by condensation and sorption, there is a residual content in the exhaust which must be reduced to acceptable levels by catalytic reoxidation at the lowest possible temperature.

OBJECT OF THE INVENTION

The object of the invention is therefore to provide economical, effective and efficient catalysts, by means of which compounds containing oxygen and/or nitrogen can be reliably removed.

SUMMARY OF THE INVENTION

This object is achieved according to the invention by the use of a carrier-supported catalyst on the basis of transition metal phthalocyanines for the oxidation treatment of exhaust gases which contain volatile organic compounds containing oxygen and/or nitrogen, which catalyst can be obtained by charging a carrier with at least one transition metal phthalocyanine and the activation of the charged carrier with (i) a gas mixture which contains nitrogen oxide and/or oxygen, at temperatures between room temperature and 500° C., or with (ii) a solution which contains nitric acid and/or an oxidation agent.

One aspect of the invention resides broadly in a process for the manufacture of a catalyst for treatment of exhaust gases containing volatile compounds, which volatile compounds contain at least one of: oxygen and nitrogen, the catalyst containing at least one transition metal phthalocyanine, the process comprising the steps of: forming the catalyst; activating the catalyst by at least one of: (i) a gas mixture including an activation gas, the activation gas containing at least one of: nitrogen oxide and oxygen; at a temperature between about room temperature and about 500° C., and; (ii) a solution which contains at least one of: nitric acid and an oxidation agent; the catalyst for use in a method of treatment of exhaust gases, the method comprising the following steps: passing exhaust gases over the catalyst; reacting the volatile compounds with the catalyst, the volatile compounds containing at least one atom of at least one of oxygen and nitrogen.

Another aspect of the invention resides broadly in a method of treatment of exhaust gases containing volatile compounds, which volatile compounds contain at least one of: oxygen and nitrogen, said method being performed with a catalyst containing at least one transition metal phthalocyanine, the method comprising: providing a catalyst comprising at least one transition metal phthalocyanine; the catalyst being activated by at least one of: (i) a gas mixture including an activation gas, the activation gas containing at least one of: nitrogen oxide and oxygen, the activating being done at a temperature between about room temperature and about 500° C., and; (ii) a solution which contains at least one of: nitric acid and an oxidation agent; the method of treatment of exhaust gases comprising the further following steps; passing exhaust gases over the catalyst; and reacting the volatile compounds with the catalyst, the volatile compounds containing at least one atom of at least one of oxygen and nitrogen.

Yet another aspect of the invention resides broadly in a catalyst for treatment of exhaust gases containing volatile compounds, which volatile compounds contain at least one of: oxygen and nitrogen, the catalyst containing at least one transition metal phthalocyanine, the catalyst having been activated by at least one of: (i) a gas mixture including an activation gas, the activation gas containing at least one of: nitrogen oxide and oxygen; at a temperature between about room temperature and about 500° C., and; (ii) a solution which contains at least one of; nitric acid and an oxidation agent; the catalyst for use in a method of treatment of exhaust gases, the method comprising the following steps: passing exhaust gases over the catalyst; reacting the volatile compounds with the catalyst, the volatile compounds containing at least one atom of at least one of oxygen and nitrogen.

DESCRIPTION OF THE PREFERRED EMBODIMENTS

For the catalysts according to the invention, basically the phthalocyanine complexes of all transition metals can be used. One particular advantage of the invention, however, is that it is not necessary to use those transition metals which are characterized by a high price or particular toxicity, e.g. gold, silver, platinum, chromium or nickel, although these metals can be used quite successfully. Preference is given to the use of complexes of the metals V, W, Mn, Cu, Fe, Co and Ni, whereby more than one transition metal can also be used. Special preference is given to copper phthalocyanine, iron phthalocyanine and manganese phthalocyanine.

The carriers used can be conventional materials of the prior art, in particular the substances and mixtures of substances disclosed and used in German Laid Open Patent Application No. 35 22 637 and European Laid Open Patent Application No. 0 228 398.

Preferred carriers are diatomaceous earth, silicon dioxide, cordierite, steatite, mullite, aluminum oxide, alumina, kaolin and perlite, feldspars, plus aluminosilicate, in particular Type A, X, Y or ZSM zeolites and natural zeolites. Other preferred substances include graphite, magnesium silicate and magnesium oxide, zicronium silicate and zirconium oxide, titanium dioxide and silicon carbide and metals with and without oxide coatings.

Preferably, the carrier materials used according to the invention have a microporous structure.

Carriers on a cordierite basis have been shown to be particulary advantageous, in particular cordierite honeycomb structures and aluminum oxide and zeolites. These carrier materials can also be applied on other substrates, such as metal, glass, ceramic, glass or mineral fibers.

The carrier materials are charged with the transition metal phthalocyanines, as disclosed in German Laid Open Patent Application No. 35 22 637 and European Laid Open Patent Application No. 0 228 398. This can be done, for example, by saturating the carrier with a solution or suspension of the corresponding metal phthalocyanine in water or an organic solvent, by mechanical application, mixing the pulverized materials and subsequent molding of the charged carrier, or by an application of a solution or suspension of a transition metal compound which can be converted into the desired transition metal phthalocyanine, i.e. by synthesis of the transition metal phthalocyanine on the carrier.

The quantities of transition metal phthalocyanine applied are generally 2 wt. % to 15 wt. %, preferably 5 wt. % to 10 wt. %, in relation to the weight of the carrier material.

The carrier-supported catalysts according to the invention are suitable for the removal of nitrogen oxides, carbon monoxide and organic compounds from air and exhaust gases, e.g. from internal combustion engines, power generation plants, and in particular from installations in which organic chemicals or solvents are produced, processed or used. The catalysts according to the invention are suitable in particular for the oxidizing removal of volatile organic compounds containing oxygen and/or nitrogen. Such volatile organic compounds include alcohols, ketones, aldehydes, ethers, acids, esters, amides and amines.

Of particularly favorable effect for a high activity of the catalysts used according to the invention are intermediate layers of oxides of one or more transition metals, generally called "washcoats", which is less a stratified structure than an intimate mixture of the washcoat and the catalytic substance. The intermediate layers of transition metal oxides must therefore be applied before or together with the transition metal complex compounds on the carrier or in it. The application of the washcoat is performed in the manner described above. The amount of transition metal oxide is generally 0.5 wt. % to 30 wt. %, preferably 2 wt. % to 25 wt. %, in addition to the amount of the complex compound. The transition metal of the oxide intermediate layer can be the same as or different from that of the phthalocyanine.

The uniform distribution both of the applied catalyst precursors and also of the catalysts produced from them in carrier volumes with completely impregnated carriers or in a layer close to the surface for incompletely impregnated carriers can be detected by infrared spectroscopic examination of fractures, sections and slides. By means of the intimate mixture of catalysts and carriers achieved with the above-mentioned preparation methods, the catalysts are resistant to being carried off by the high gas current even at very high space velocities (SV) of up to $10^6 \, h^{-1}$. In completely impregnated carriers, moreover, when the surface is worn away by the dust in the exhaust gas, the continuously regenerated surface always provides an activated catalyst.

The activation of the carrier charged with at least one transition metal phthalocyanine is disclosed in German Laid Open Patent No. 35 22 637 and European Laid Open Patent Application No. 0 228 398. It can be obtained by means of a gas mixture which contains nitrogen oxide and/or oxygen. As a rule, an inert gas is used, e.g. nitrogen or argon, to which is added a specified quantity of nitrogen oxide and/or oxygen. The nitrogen oxide used can be either NO or $NO_2$, although NO is preferable. Other components of the activation gas mixture which produce particularly good results are CO and $NH_3$.

The charged carrier is activated at a temperature between room temperature and 500° C. Generally, for this purpose, the charged carrier is heated in the activation gas mixture from room temperature to a temperature between 80° and 500° C., preferably between 180° and 450° C., over a period of 1 to 10 hours, and is held at the final temperature as appropriate for up to 10 hours.

The activation gas mixture contains the activating components, generally in quantities from 250 ppm to 5%, in relation to the volume. The oxygen content is preferably 0.1 vol. % to 25 vol. %, and the concentration of NO and any other gases which may be present is 500 ppm to 5000 ppm. Particularly preferably is a concentration of approximately 1000 ppm each of NO, CO and $NH_3$, and approximately 1% to 2% $O_2$. The activation can also be done using air.

As an alternative to the activation with a gas mixture at elevated temperatures, the carrier can also be charged with a solution which contains nitric acid and/or an oxidation agent. The solvent used is preferably water or an aqueous organic solution, which is inert in relation to nitric acid. The concentration of nitric acid is generally between 1 wt. % and 20 wt. %, and the concentration of oxidation agent is generally between 2 wt. % and 20 wt. %. Other oxidation agents used can be nitrous acid as well as nitrating acids and solutions of nitrogen oxides. The activation is preferably conducted in the presence of heat, e.g. at temperatures between 20° C. and 50° C.

The activation of the transition metal complex compound can also take place before the charging of the carrier in solution, whereby the above-mentioned nitric acid or oxidation agent solution is used.

For the complexes used according to the invention, there is an interaction with transition metal oxides, such that the temperatures of the oxidizing partial decomposition by oxidizing or nitrating gases and vapors in the presence of intimately mixed transition metal oxides are significantly lower than the known stability limits of the compounds in question, without contact with transition metal oxides, in oxidizing atmospheres.

It is known that metal oxides and mixtures of metal oxides can be used in various ways for catalytic reactions with NO and also for oxidations. Careful examination in terms of activity and conversion, in particular by examining the characteristic conversion as a function of the temperature, showed that the catalysts according to the invention produced by the joint application of metal oxide and metal complex on or in carriers differ from preparations in which only the metal oxide has been applied or added. This examination is particularly persuasive if only the transition metal oxide is added, its activity is tested, and then the metal complex is added to it and modified. There are significant differences in the conversion characteristics compared to carriers charged only with oxide, in particular in the lower temperature range below 250° C.

The major surface differences between the active catalyst preparations used according to the inventions and the oxides are also apparent in scanning electron microscope photographs of the surfaces. Photoelectron spectroscopy examinations show that even after the decomposition of the complexes by nitrating or oxidizing treatment, ingredients of the organic components are still contained in the active surfaces. The invention is described in greater detail by the following examples.

EXAMPLES

The invention is explained in greater detail by the following examples. In the examples, the manufacture of the catalysts on the carriers is first described. To the extent that is applies only to the application by saturation of the carrier by means of solutions or suspensions, only the composition of the saturation solution or saturation suspension is indicated. The carrier bodies used are primarily cordierite honeycomb structures, as a rule with a cross section of $2.5 \times 2.5$ cm$^2$ and 5 cm or 10 cm long, with 16 channels on the cross section indicated above. The saturation is performed several times, until the specified charge is reached. The carriers are dried between the saturations, preferably at 110° C. to 120° C. For the activation, a gas mixture is used, the composition of which is specified. Following the description of the manufacture and activation, the activities, i.e. the conversion rates which are achieved in various catalytic purification processes, are indicated in table form.

EXAMPLE 1

Copper phthalocyanins on manganese oxide/copper oxide washcoat

Saturation solutions
1. 123 g Mn(CH$_3$COO)$_2 \times$ 4 H$_2$O in 500 ml water
2. 12 g Cu(NO$_3$)$_2 \times$ 3 H$_2$O in 500 ml water
3. Suspension of 50 g CuPc in 500 ml formic acid.
Carrier: Cordierite honeycomb structure
Charging by successive saturations at room temperature up to the indicated values
1. 1.5 wt. % manganese acetate
2. 1.5 wt. % copper nitrate
3. 9 wt. % CuPc.

Activation in gas mixture of 1000 ppm each NO, NH$_3$, 1% O$_2$, rest N$_2$ with SV=3000 h$^{-1}$, increasing over 5 hours from room temperature to 320° C.

| Reaction | Activity: Conversion (%) | Temp. °C. | Test Gas SV = 3000 h$^{-1}$ |
|---|---|---|---|
| NO reduction | 89 | 189 | 1000 ppm each NO, NH$_3$ 1% O$_2$, rest N$_2$ |
| CO oxidation | 100 | 110 | 1100 ppm CO, 2500 ppm O$_2$, rest N$_2$ |
| Propane oxidation | 91 | 319 | 1000 ppm propane in air |
| Ethanol oxidation | 98 | 205 | 1800 ppm ethanol in air |
| Acetone oxidation | 92 | 218 | 2000 ppm acetone in air |
| Ethylacetate oxidation | 97 | 214 | 500 ppm ethylacetate in air |
| Ether oxidation | 93 | 239 | 1500 ppm ether in air |
| Benzol oxidation | 93 | 260 | 300 ppm benzol in air |
| Benzylamine oxidation | 89 | 240 | 1100 ppm benzylamine in air |
| Aniline oxidation | 90 | 245 | 1200 ppm aniline in air. |

EXAMPLE 2

Copper phthalocyanine on manganese oxide washcoat

Saturation solutions:
1. 125 g Mn (CH$_3$COO)$_2 \times$ 4 H$_2$O in 500 ml water.
2. Suspension of 20 g CuPc in 200 ml formic acid.
Carrier: Cordierite honeycomb structure
Charging by saturations up to the following values
1. 15 wt. % manganese acetate
2. 9 wt. % CuPc.

Activation in gas mixture of 1000 ppm each NO and NH$_3$, 1% O$_2$, rest N$_2$ at SV=3000 h$^{-1}$ increasing over 5 hours from room temperature to 320° C.

| Reaction | Activity: Conversion (%) | Temp. °C. | Test Gas SV = 3000 h$^{-1}$ |
|---|---|---|---|
| NO reduction | 92 | 180 | 1000 ppm each NO, NH$_3$, 1% O$_2$, rest N$_2$ |
| CO oxidation | 100 | 115 | 1100 ppm CO, 2500 ppm O$_2$, rest N$_2$ |
| Propane oxidation | 91 | 328 | 1000 ppm propane in air |
| Ethanol oxidation | 93 | 210 | 1800 ppm ethanol in air |
| Acetone oxidation | 90 | 225 | 2000 ppm acetone in air |
| Ethylacetate oxidation | 96 | 220 | 500 ppm ethylacetate in air |
| Ether oxidation | 92 | 246 | 1500 ppm ether in air |
| Benzol oxidation | 92 | 297 | 300 ppm benzol in air |
| Benzylamine oxidation | 86 | 249 | 1100 ppm benzylamine in air |
| Aniline oxidation | 90 | 251 | 1200 ppm aniline in air. |

EXAMPLE 3

Copper phthalocyanine on cobalt oxide/copper oxide washcoat

Saturation solutions:
1. 148 g $Cu(NO_3)_2 \times 3$ $H_2O$ and 146 g $Co(NO_3)_2 \times 6$ $H_2O$ together in 500 ml water
2. Suspension of 50 g CuPc in 500 ml formic acid Carrier: Cordierite honeycomb structure Saturation until the following charges are reached
1. 24 wt. % copper cobalt nitrate mixture
2. 9 wt. % CuPc.

Activation in gas mixture of 1000 ppm each NO and $NH_3$, 1% $O_2$, rest $N_2$ with SV=3000 $h^{-1}$ increasing over 5 hours from room temperature to 320° C.

| Reaction | Activity: Conversion (%) | Temp. °C. | Test Gas SV = 3000 $h^{-1}$ |
|---|---|---|---|
| NO reduction | 90 | 150 | 1000 ppm each NO, 1200 $NH_3$, 1% $O_2$, remainder $N_2$ |
|  | 80 | 130–180 | 1000 ppm each NO, 1200 $NH_3$, 1% $O_2$, remainder $N_2$ |
| CO oxidation | 100 | 105 | 1100 ppm CO, 2500 ppm $O_2$, rest $N_2$ |
| Propane oxidation | 95 | 325 | 1000 ppm propane in air |
| Ethanol oxidation | 100 | 216 | 1800 ppm ethanol in air |
| Acetone oxidation | 95 | 225 | 2000 ppm acetone in air |
| Ethylacetate oxidation | 100 | 200 | 500 ppm ethylacetate in air |
| Ether oxidation | 95 | 221 | 1500 ppm ether in air |
| Benzol oxidation | 90 | 260 | 300 ppm benzol in air |
| Benzylamine oxidation | 100 | 275 | 1100 ppm benzylamine in air |
| Aniline oxidation | 90 | 263 | 1200 ppm aniline in air. |

Similar results were obtained when the phthalocyanines of Mn, Fe, Co and Ni were used instead of copper phthalocyanines.

EXAMPLE 4

Manganese phthalocyanine on manganese oxide/copper oxide washcoat

Saturation solutions
1. 130 g manganese acetate, $Mn(CH_3COO)_2 \times 4$ $H_2O$ in 500 ml water
2. 12 g copper nitrate $Cu(NO_3)_2 \times 3$ $H_2O$ in 500 ml water
3. Suspension of 60 g MnPc in 500 ml formic acid Carrier: Cordierite honeycomb structure Charging by successive saturations at room temperature up to the indicated values
1. 15 wt. % manganese acetate
2. 1.5 wt. % copper nitrate
3. 10.5 wt. % manganese phthalocyanine Activation by treatment in gas mixture of 1000 ppm each NO and $NH_3$, 1% $O_2$, rest $N_2$ with SV=3000 $h^{-1}$ increasing over 5 hours from room temperature to 280° C.

| Reaction | Activity: Conversion (%) | Temp. °C. | Test Gas SV = 3000 $h^{-1}$ |
|---|---|---|---|
| NO reduction | 89 | 175 | 1000 ppm each NO, $NH_3$, 1% $O_2$, rest $N_2$ |
| Ethanol oxidation | 90 | 245 | 1800 ppm ethanol in air |
| Acetone oxidation | 90 | 235 | 2000 ppm acetone in air |
| Ethylacetate oxidation | 90 | 248 | 500 ppm ethylacetate in air |
| Ether oxidation | 90 | 265 | 1500 ppm ether in air |
| Benzol oxidation | 95 | 297 | 300 ppm benzol in air |
| Benzylamine oxidation | 80 | 255 | 1100 ppm benzylamine in air |
| Aniline oxidation | 89 | 305 | 1200 ppm aniline in air. |
| Propane oxidation | 90 | 345 | 1000 ppm propane in air |
| CO oxidation | 98 | 160 | 1100 ppm CO, 2500 ppm $O_2$, rest $N_2$ |

EXAMPLE 5

Iron phthalocyanine on iron oxide washcoat

Saturation solutions
1. 80 g iron nitrate in 200 ml water
2. Suspension of 80 g iron phthalocyanine in 500 ml formic acid Carrier: Cordierite honeycomb structure Charging by repeated saturation up to
1. 7 wt. % iron nitrate
2. 12 wt. % iron phthalocyanine Activation by treatment in gas mixture of 1000 ppm each NO and $NH_3$, 1% $O_2$, rest $N_2$ with SV=3000 $h^{-1}$ increasing over 8 hours to 340° C.

| Reaction | Activity: Conversion (%) | Temp. °C. | Test Gas SV = 3000 $h^{-1}$ |
|---|---|---|---|
| NO reduction | 85 | 310 | 1000 ppm each NO, $NH_3$, 1% $O_2$, rest $N_2$ |
| Ethanol oxidation | 92 | 275 | 1800 ppm ethanol in air |
| Acetone oxidation | 86 | 260 | 2000 ppm acetone in air |
| Ethylacetate oxidation | 90 | 270 | 500 ppm ethylacetate in air |
| Ether oxidation | 90 | 295 | 1500 ppm ether in air |
| Benzol oxidation | 96 | 320 | 300 ppm benzol in air |
| Benzylamine oxidation | 80 | 285 | 1100 ppm benzylamine in air |
| Aniline oxidation | 89 | 335 | 1200 ppm aniline in air. |
| Propane oxidation | 91 | 360 | 1000 ppm propane in air |

In summary, one feature of the invention resides broadly in the use of a carrier-supported catalyst on the basis of transition metal phthalocyanines for the oxidation treatment of exhaust gases which contain volatile compounds containing oxygen and/or nitrogen, which catalyst can be obtained by charging a carrier with at least one transition metal phthalocyanine and activation of the charged carrier with (i) a gas mixture which contains nitrogen oxide and/or oxygen, at temperatures between room temperature and 500° C., or with (ii) a solution which contains nitric acid and/or an oxidation agent.

Another feature of the invention resides broadly in the use of a carrier-supported catalyst wherein the catalyst carrier is charged with at least one transition metal oxide in addition to the transition metal phthalocyanine.

Yet another feature of the invention resides broadly in the use of a carrier-supported catalyst wherein the transition metal is at least one of the group Cr, Mo, Mn, Fe, Co, Ni or Cu.

A further feature of the invention resides broadly in the use of a carrier-supported catalyst wherein the carrier is charged with copper phthalocyanine, iron phthalocyanine or manganese phthalocyanine and iron oxide, manganese oxide, cobalt oxide and/or copper oxide.

A yet further feature of the invention resides broadly in the use of a carrier-supported catalyst wherein the carrier material is aluminum oxide, silicon dioxide, silicate, zeolite or aluminosilicate.

Yet another further feature of the invention resides broadly in the use of a carrier-supported catalyst wherein a cordierite or mullite honeycomb structure is used.

A yet further feature of the invention resides broadly in the use of a carrier-supported catalyst wherein the carrier is charged with copper phthalocyanine, iron phthalocyanine, manganese phthalocyanine, iron oxide, manganese oxide, cobalt oxide and/or copper oxide.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentable distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A catalyst for oxidizing volatile organic compounds, which volatile organic compounds contain at least one of: oxygen and nitrogen, said catalyst comprising:
   a carrier; and at least one transition metal phthalocyanine disposed at least on a surface of said carrier;
   said catalyst being activated by contacting said catalyst with at least one of:
     (i) a gas mixture including an activation gas, the activation gas containing at least one of: nitrogen oxide and oxygen;
       at a temperature between about room temperature and about 500° C., and;
     (ii) a solution which contains at least one of: nitric acid and an oxidation agent;
   said activated catalyst being used in a method of oxidizing volatile organic compounds, the method comprising the following steps:
     passing the volatile organic compounds over said activated catalyst;
     oxidizing the volatile organic compounds with said catalyst, the volatile organic compounds containing at least one atom of at least one of oxygen and nitrogen; and
   said transition metal phthalocyanine essentially comprising at least one transition metal from the group consisting of: vanadium, wolfram, chromium, molybdenum, and manganese.

2. The catalyst according to claim 1, wherein said gas mixture comprises an inert gas and at least one activation gas, and a quantity of said at least one activation gas in relation to the total volume of said gas mixture is in a range of from about 250 ppm to about 5% by volume.

3. The catalyst according to claim 2, wherein the oxygen content of said gas mixture is preferably in the range of about 0.1 vol. % to about 25 vol. %, and the concentration of nitrogen oxide is in the range of about 500 ppm to 5000 ppm.

4. The catalyst according to claim 3, wherein:
   the at least one activation gas comprises a concentration of approximately 1000 ppm each of nitrogen oxide, carbon monoxide, and ammonia, and approximately 1 vol. % to 2 vol. % of oxygen; and
   said activating by contacting said catalyst with said gas mixture further comprises:
     heating said catalyst in contact with said gas mixture from room temperature to a maximum temperature of between about 80° C. to about 500° C. over a time period of from 1 to 10 hours; and
     thereafter maintaining the temperature at said maximum temperature for up to about 10 hours.

5. The catalyst according to claim 1, wherein:
   said solution which contains at least one of: nitric acid and an oxidation agent comprises an aqueous solution;
   the concentration of said nitric acid in said solution is generally between about 1 wt. % and about 20 wt. %;
   the concentration of said oxidation agent in said solution is generally between about 2 wt. % and about 20 wt. %; and
   said solution is applied to said catalyst in the presence of heat in a temperature range between about 20° C. and about 50° C.

6. Process for the manufacture of a catalyst for use in treatment of exhaust gases containing volatile organic compounds, which volatile organic compounds contain at least one of: oxygen and nitrogen, said catalyst containing at least one transition metal phthalocyanine on a carrier, said process comprising the steps of:
   forming said metal phthalocyanine catalyst;
   activating said metal phthalocyanine catalyst by contacting said metal phthalocyanine catalyst with at least one of:
     (i) a gas mixture including an activation gas, the activation gas containing at least one of: nitrogen oxide and oxygen;
       at a temperature between about room temperature and about 500° C., and;
     (ii) a solution which contains at least one of: nitric acid and an oxidation agent;
   said activated metal phthalocyanine catalyst being used in a method of treatment of exhaust gases containing volatile organic compounds, the method comprising the following steps:
     passing the exhaust gases containing the volatile organic compounds over said activated metal phthalocyanine catalyst;
     oxidizing the volatile organic compounds in the exhaust gases with said catalyst, the volatile organic compounds containing at least one atom of at least one of oxygen and nitrogen; and
   the transition metal phthalocyanine essentially comprising at least one transition metal from the group consisting of vanadium, wolfram, chromium, molybdenum, and manganese.

7. The process according to claim 6, wherein said gas mixture comprises an inert gas and at least one activation gas, and a quantity of said activation gas in relation to the total volume of the gas mixture is in a range of from about 250 ppm to about 5% by volume.

8. The process according to claim 7, wherein the oxygen content of said gas mixture is preferably in the range of about 0.1 vol. % to about 25 vol. %, and the concentration of nitrogen oxides in the range of about 500 ppm to 5000 ppm.

9. The process according to claim 8, wherein:
said at least one activation gas comprises a concentration of approximately 1000 ppm each of nitrogen oxide, carbon monoxide, and ammonia, and approximately 1 vol. % to 2 vol. % of $O_2$; and
said activating by contacting said catalyst with said gas mixture further comprises:
heating said catalyst in contact with said gas mixture from room temperature to a maximum temperature of between about 80° C. to about 500° C. over a time period of from about 1 to about 10 hours; and
thereafter maintaining the temperature at said maximum temperature for up to about 10 hours.

10. The process according to claim 6, wherein:
said solution which contains at least one of: nitric acid and an oxidation agent comprises an aqueous solution;
the concentration of said nitric acid in said solution is generally between about 1 wt. % and about 20 wt. %;
the concentration of said oxidation agent in said solution is generally between about 2 wt. % and about 20 wt. %; and
said solution is applied in the presence of heat in a temperature range between about 20° C. to about 50° C.

11. The catalyst according to claim 1, wherein said carrier essentially comprises at least one member of the group consisting of: a material comprising a cordierite honeycomb structure and a material comprising a mullite honeycomb structure.

12. The catalyst according to claim 1, wherein the volatile organic compounds essentially comprise at least one member of the group consisting of:
alcohols, ketones, aldehydes, ethers, acids, esters, amides, and amines.

13. The catalyst according to claim 1, wherein:
said carrier is charged with at least one transition metal oxide in addition to said at least one transition metal phthalocyanine; and
said transition metal oxide comprises one transition metal from the group consisting of: vanadium, wolfram, chromium, molybdenum, and manganese.

14. The process according to claim 6, wherein the carrier essentially comprises at least one member of the group consisting of: a material comprising a cordierite honeycomb structure and a material comprising a mullite honeycomb structure.

15. The process according to claim 6, wherein the volatile organic compounds essentially comprise at least one member of the group consisting of:
alcohols, ketones, aldehydes, ethers, acids, esters, amides, and amines.

16. The process according to claim 6, wherein:
the carrier is charged with at least one transition metal oxide in addition to the at least one transition metal phthalocyanine; and
the transition metal oxide comprises one transition metal from the group consisting of: vanadium, wolfram, chromium, molybdenum, and manganese.

17. The catalyst according to claim 13, wherein said carrier is charged with at least
manganese oxide.

18. The catalyst according to claim 17, wherein:
the amount of said at least one transition metal phthalocyanine applied to said carrier in relation to the weight of said carrier, is generally about 2 wt. % of the weight of said carrier to about 15 wt. % of the weight of said carrier; and
the amount of said transition metal oxide is generally about 0.5 wt. % to about 30 wt. % of the weight of said carrier.

19. The process according to claim 16, wherein the carrier is charged with at least
manganese oxide.

20. The process according to claim 19, wherein:
the amount of the at least one transition metal phthalocyanine applied to the carrier in relation to the weight of the carrier, is generally about 2 wt. % of the weight of the carrier to about 15 wt. % of the weight of the carrier; and
the amount of transition metal oxide is generally about 0.5 wt. % to about 30 wt. % of the weight of the carrier.

* * * * *